July 1, 1924.

B. M. W. HANSON

COLLET MECHANISM

Filed Aug. 20, 1921

1,499,727

Inventor

Bengt M W Hanson

By

His Attorney

Patented July 1, 1924.

1,499,727

UNITED STATES PATENT OFFICE.

BENGT M. W. HANSON, OF HARTFORD, CONNECTICUT.

COLLET MECHANISM.

Application filed August 20, 1921. Serial No. 493,781.

*To all whom it may concern:*

Be it known that I, BENGT M. W. HANSON, a citizen of the United States, and a resident of Hartford, in the county of Hartford, State of Connecticut, have invented certain new and useful Improvements in a Collet Mechanism, of which the following is a specification.

The object of this invention is to improve the construction of what is known as collet mechanisms commonly used for holding the shanks of tools, such as milling cutters, or pieces of work to be operated upon.

More particularly the aim of the present invention is to provide a simple and effective device of this sort wherein the tool shank or other member to be held is not displaced or moved longitudinally when the collet is brought into gripping engagement therewith.

In the accompanying drawings—

Figure 1:
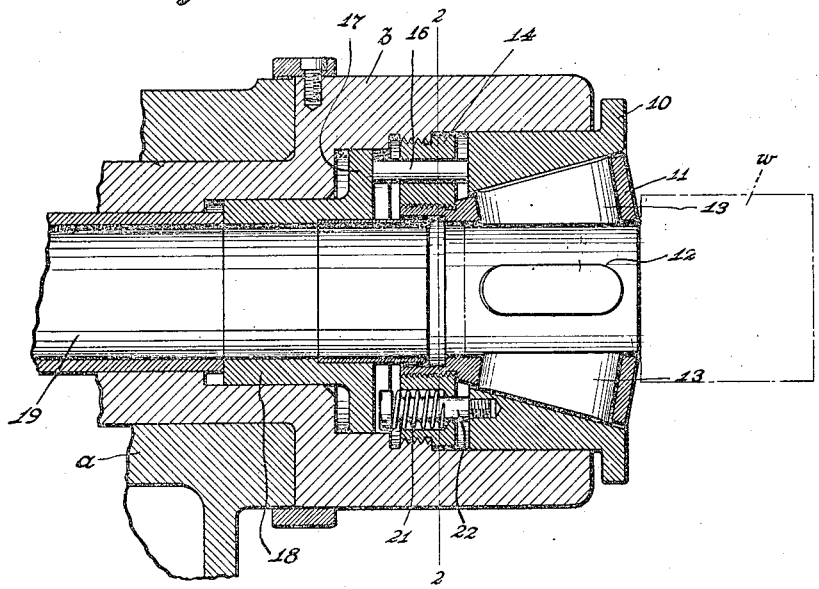
Fig. 1 is a view in longitudinal section of my improved collet mechanism.
Figure 2:
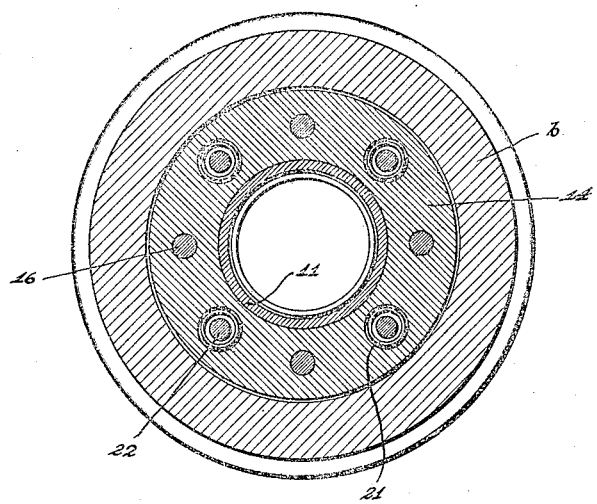
Fig. 2 is a transverse section on the line 2—2 of Fig. 1.

Referring to the drawings in detail, $a$ denotes a suitable support or bearing member in which is journalled a rotary member $b$, here shown as being in the form of a spindle, the forward end of which is chambered and counterbored as illustrated.

Slidably mounted in the forward end of the spindle $b$ is a sleeve 10 the internal periphery of which is conical or tapered as shown. Located within this sleeve is a cage 11 provided with slots 12 within which are mounted jaws 13, the outer faces of which are inclined similarly to and engage with the internal periphery of the sleeve 10. The cage 11 is secured to the spindle $b$, against relative rotary and longitudinal movements, by means of a ring nut 14.

Slidably mounted in openings in the nut 14 are a plurality of pins 16 engaging at their forward ends against the rear or inner end of the sleeve 10. Abutting against the rear ends of the pins 16 is a flange 17 on a tubular part 18 mounted for sliding movement within the spindle $b$. 19 denotes a push bar slidably mounted in the spindle $b$ and engaging at its forward end against the part 18. It is of course understood that the push bar 18 at its rear end (not shown) is provided with suitable mechanism for advancing and withdrawing this bar. The sleeve 10 is normally urged inwardly of the spindle by coiled springs 21 positioned about bolts 22 connected to the sleeve 10 and extending through the nut 14.

It will be seen that with the construction described when the push bar 19 is advanced it acts through part 18 and the pins 16 to move the sleeve 10 in a direction to force the jaws 13 against the piece to be held. Owing to the fact that the cage 11 is fixed against longitudinal movement relative to the spindle, it will be clear that when the jaws are brought into gripping engagement with the member to be held there is no tendency for this member to be moved longitudinally. This means that if a piece of work as positioned within the collet has a predetermined relation to a tool, the position of this piece is not disturbed when it is gripped by the collet. This is of advantage, for instance, where a number of pieces of work, such as that shown in dotted lines in the drawing and indicated by the letter $w$, are to be operated upon. Each of these pieces of work may be inserted into the collet so as to bring the shoulder on the work into engagement with the forward edge of the cage and in which position the work has a correct predetermined position relative to the tool. This position of the pieces of work will not be disturbed in any manner when the collet mechanism is actuated to grip the same. When it is desired to release the work it is merely necessary to withdraw the push bar 19 whereupon the springs will retract the sleeve 10, leaving the jaws free to move radially outward.

It is, of course, obvious that my invention is susceptible of various modifications and changes which are within the spirit of the invention without departing from the scope of the following claims it being understood that the present disclosure of my invention is by way of illustration only and it is not to be taken as restrictive of my conception.

I claim as my invention:—

1. In a device of the character described, a spindle, a cage mounted therein, a member connecting the rear end of said cage to said spindle, jaws in said cage, a sleeve about said cage and jaws, and means for positively moving said sleeve in a directon to force said jaws together, said means including a part slidably carried by said connecting member.

2. In a device of the character described, a spindle, a cage, a member connecting the rear end of said cage to said spindle, jaws in said cage forwardly of said member, a sleeve about said cage and jaws, a part slidably mounted within said spindle, and a part slidably carried by said connecting member for associating said part within the spindle with said sleeve whereby said sleeve may be positively moved in a direction to force said jaws together.

3. In a device of character described, a spindle chambered at its forward end, a cage mounted within the chamber of said spindle, a ring nut connecting the rear end of said cage to said spindle, jaws mounted in said cage, an internally tapered sleeve about said jaws, a plurality of pins slidably mounted in said nut and engaging said sleeve, a part slidably mounted in said spindle and engaging the rear ends of said pins, bolts connected to said sleeve and extending through said nut, and springs associated with said bolts for retracting said sleeve to release said jaws.

4. In a device of the character described, a spindle, a cage, a ring nut connecting the rear end of said cage to said spindle, jaws mounted in said cage for radial movement, an internally tapered sleeve about said cage and jaws, a plurality of pins slidably mounted in said nut and engaging said sleeve, and a part slidably mounted in said spindle and engaging the rear ends of said pins.

5. In a device of the character described, a spindle, a cage, a ring nut connecting the rear end of said cage to said spindle, jaws mounted in said cage forwardly of said nut, an internally tapered sleeve about said cage and jaws, a plurality of pins slidably mounted in said nut and engaging said sleeve, a part slidably mounted within said spindle and engaging the rear ends of said pins, bolts connected to said sleeve and projecting through said nut, and springs between said nut and the heads of said bolts for retracting said sleeve to release the jaws.

BENGT M. W. HANSON.